United States Patent
Kishida

[11] Patent Number: 6,085,457
[45] Date of Patent: Jul. 11, 2000

[54] FISHHOOK

[76] Inventor: Yoshihisa Kishida, 3-2-2, Shinsenrinishmachi, Toyonaka-shi, Osaka-fu, Japan

[21] Appl. No.: 09/071,867

[22] Filed: May 5, 1998

[30] Foreign Application Priority Data

Jun. 13, 1997 [JP] Japan ................................ 9-173003

[51] Int. Cl.[7] .................................................. A01K 83/00
[52] U.S. Cl. .............................................................. 43/43.16
[58] Field of Search ............................... 43/43.16, 44.82, 43/44.83; D22/144

[56] References Cited

U.S. PATENT DOCUMENTS

| 319,655 | 6/1885 | Wright | 43/43.16 |
| 2,255,793 | 9/1941 | Kridler | 43/43.16 |

FOREIGN PATENT DOCUMENTS

| 726188 | 5/1932 | France | 43/44.83 |
| 54921 | 2/1935 | Norway | 43/43.16 |
| 793 | 1/1884 | United Kingdom | 43/44.83 |

Primary Examiner—Kurt Rowan
Attorney, Agent, or Firm—Wenderoth, Lind & Ponack, L.L.P.

[57] ABSTRACT

The invention provides a structure of a fishhook in which a root portion of the fishhook has no protruding portions like a line retainer so that the whole fishhook can be covered with bait, and which allows the fishhook to be easily removed from the skin upon an accident in which the hook tip sticks into the skin. In the fishhook, which has a through hole through for the fishing line to be passed therethrough, a groove is provided on the surface of the fishhook so as to range from one opening of the through hole via a tip end of the root portion of the fishhook to the other opening of the through hole.

10 Claims, 3 Drawing Sheets

FISHHOOK

BACKGROUND OF THE INVENTION

1. Field of the Invention

The present invention relates to a fishhook for fishing and more specifically, to a structure of a fishhook which provides a better attraction of fish and which can be easily removed when accidentally stuck in skin.

2. Description of the Prior Art

FIG. 5 shows a conventional fishhook 1 in a state of use. As shown in FIG. 5 (A), during fishing, a fishing line 5 is tied to a root portion 2 of the fishhook 1 by using a machine or tool (exclusively used for tying fishing line) to form a knot 6. Further, the fishhook 1 is covered with bait 7, and then submerged in water. This fishhook 1 and bait 7 is kept as is until some fish bites the bait 7.

A line retainer 10 is provided at the root portion 2 of the fishhook 1 to prevent the fishing line 5 from being loosened and decoupled. Because the line retainer 10 is thicker than the trunk portion of the fishhook 1 and the knot 6 of the fishing line 5 is present on the surface of the fishing line 5, the bait 7 cannot cover up to the root portion 2 so that the line retainer 10 of the root portion 2 and the knot 6 come out of the bait 7 as illustrated in this figure. This causes the fish to be cautious, which is a problem.

Moreover, accidents during the fishing may occur when attempting to fit the bait 7 on the fishhook 1 or when attempting to throw in the fishhook 1. These accidents result in sticking of the fishhook 1 into the human body, so that a hook tip 8 catches on skin 9, as shown in FIG. 5(B).

In such a case, because the hook tip 8 of the fishhook 1 has a turnback (barb), pulling out the fishhook 1 in a direction opposite to the insertion direction of the fishhook would cause pain. Therefore, usually, the fishhook 1 is pulled out from the hook tip 8 so as that it is pulled out from the skin 9.

However, because the line retainer 10 is present at the root portion 2 of the fishhook 1, it is difficult to pull out the whole fishhook 1 from the skin 9 even if the fishing line 5 is undone. As a result, in that case a portion of the fishhook 1 (indicated by broken line in the figure) needs to be cut off with pliers or the like before the fishhook 1 is pulled out.

SUMMARY OF THE INVENTION

The fishhook of the present invention solves these and other problems. An object of the invention is to provide a structure of a fishhook which does not have any protruding portions like a line retainer at a root portion of the fishhook. The whole fishhook can be covered with bait, and can be easily removed from the skin when the hook tip accidentally sticks into the skin.

In order to achieve the above object, the present invention provides a fishhook having a through hole for a fishing line to be passed therethrough. A groove is provided on the surface of the fishhook so as to range from one opening of the through hole via a tip end of a root portion of the fishhook up to the other opening of the through hole.

In the fishhook of the present invention, the fishing line that passes through the through hole passes through the groove provided at the surface of the fishhook up to the root portion of the fishhook. The depth of the groove is set to an appropriate depth by measuring between a radius and a diameter of the fishing line to allow the fishing line to be buried in the fishhook surface or to protrude only at the cross-sectional semicircular portion of the line. Thus, the fishing line is not an obstacle in covering the whole fishhook with bait.

Further, even if the fishhook has stuck into the skin accidentally, the fishhook, which has no protruding portion like a line retainer at the root portion of the fishhook, can be easily pulled out by the hook tip.

Furthermore, since the grooves provided from both through holes to the root portion of the fishhook are joined together at the end of the root portion, the fishing line keeps accommodated in the groove immediately before the knot. Thus, even if lateral force is applied to the fishing line, the fishing line never gets out of the grooves.

BRIEF DESCRIPTION OF THE DRAWINGS

FIG. 2(A) is a front sectional view, FIG. 2(B) is a side view, and FIG. 2(C) is a plan view;

FIG. 3(A) is a front sectional view and FIG. 3(B) is a side view;

FIG. 4(A) shows a state in which bait is fitted, and FIG. 4(B) shows a state of an accident when the hook tip has stuck into skin; FIG. 5(A) shows a state in which bait is fitted, and FIG. 5(B) shows a state of an accident when the hook tip has stuck into skin.

DETAILED DESCRIPTION OF THE PREFERRED EMBODIMENTS

Figure 1:
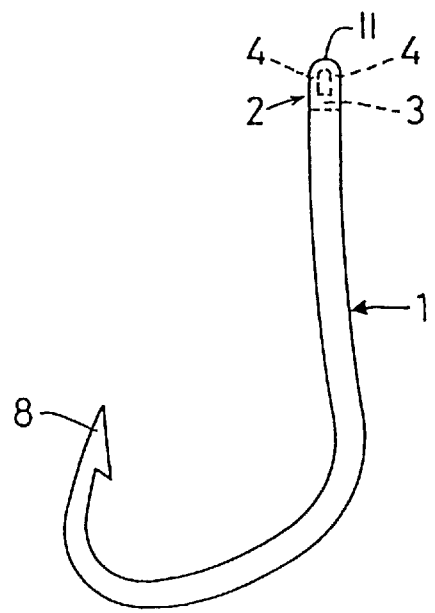
FIG. 1 is a front view of a fishhook of the present invention.

Embodiments of the present invention are described hereinbelow. Throughout the following description, the same component parts as in the conventional example are designated by like reference numerals.

FIG. 1 shows a fishhook 1 of the present invention, where a through hole 3 to pass fishing line 5 through is provided near a root portion 2 of the fishhook 1, and linear grooves 4 are formed from both openings 3a and 3b of the through hole 3 toward the root portion 2. These two grooves 4 are joined together at a tip end 11 of the root portion 2 to form one groove.

Figure 2:
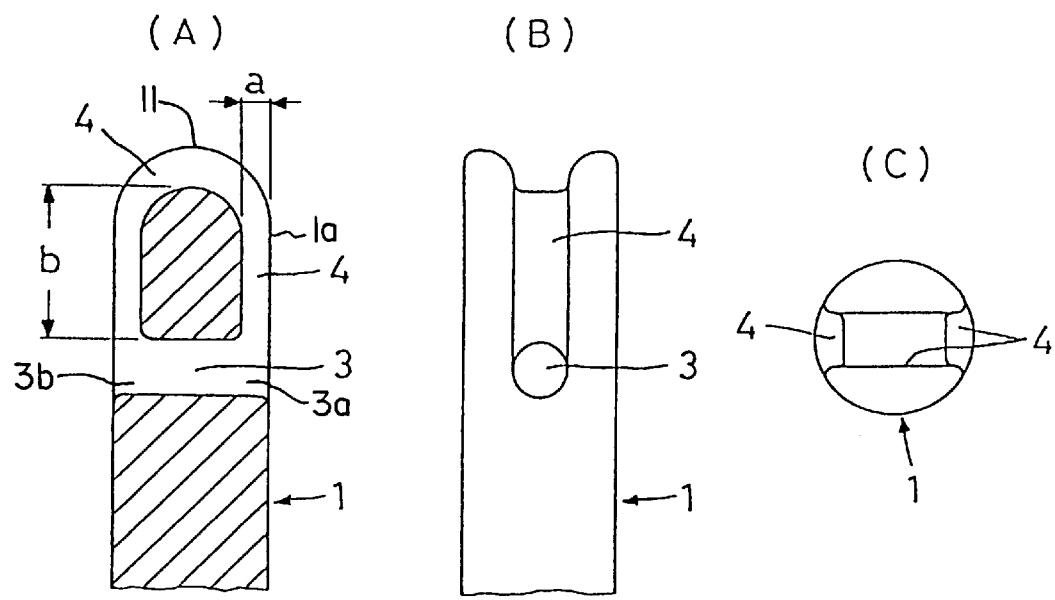
FIG. 2 is an enlarged view showing a main part of the fishhook of the invention, where

FIG. 2 is an enlarged view of the root portion 2 of the fishhook 1, where FIG. 2(A) is a front sectional view, FIG. 2(B) is a side view, and FIG. 2(C) is a plan view.

The size of the through hole 3 for the fishing line 5 is made larger than the diameter of the fishing line 5, and set to at most about 30% of the thickness of a trunk portion of the fishhook to promote strength. If the diameter of the fishing line 5 is 0.5 mm and the thickness of the fishhook 1 is 3 mm, then the diameter of the through hole 3 is within a range of about 0.6 to 1.0 mm.

The grooves 4 extending from both openings of the through hole 3 are set to a width generally equal to the diameter of the through hole 3. A depth "a" of each groove 4 is set within a range from the radius to the diameter of the fishing line. If the line thickness is 0.5 mm, then the depth "a" is about 0.3 mm to 0.5 mm.

When the depth "a" of the groove 4 is set to the diameter of the fishing line, the fishing line is completely buried in the fishhook 1 so as not to protrude from the surface of the fishhook 1. However, the depth "a" from surface 1a may be shallower than the diameter of the fishing line 5. For example, even when the depth of the groove 4 is generally equal to the radius of the fishing line, the fishing line has only a portion of its semicircular cross section protruding on the surface of the fishhook 1, so that the fishing line 5 will not obstruct the fitting of bait 7.

A distance "b" from the through hole 3 to the bottom of the groove 4 of the root portion 2 is set to a length generally equal to the diameter of the fishhook 1 in order to prevent the fishhook 1 from decreasing in strength.

It is noted that the above dimensions and sizes of the fishhook 1 are shown by way of example only, and various changes and modifications may be made without being limited to these dimensions and sizes as a matter of course.

Figure 3:
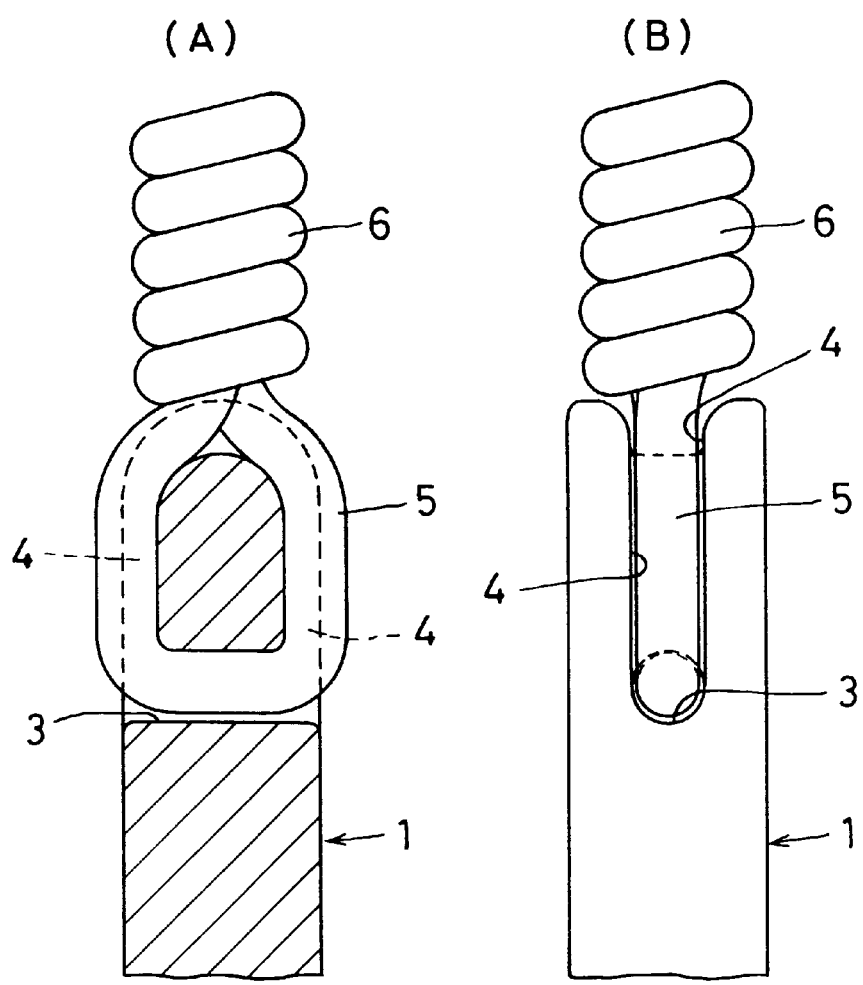
FIG. 3 is an enlarged view showing the main part in which the fishhook of the invention is equipped with a fishing line, where

FIG. 3 is as partly enlarged view of the root portion 2, showing a state in which the fishing line 5 is fitted to the fishhook 1 of the invention. FIG. 3(A) is a front sectional view, and FIG. 3(B) is a side view.

The fishing line 5 inserted through the through hole 3 of the fishhook 1 is led from both openings of the through hole 3 via the inside of the grooves 4 to a tip end of the root portion 2 of the fishhook 1. This fishing line 5 is tied above the root portion 2 with a machine or tool, which is exclusively used to tie fishing line, to form a knot 6.

The groove 4 is formed into one groove by both the side grooves 4 being joined together at the tip end 11 of the root portion 2. Therefore, the fishing line 5 passes within the groove 4 immediately before the knot 6, so that even if any lateral force is applied to the fishing line 5 at the root portion 2, the fishing line 5 never slips out of the groove 4.

Figure 4:
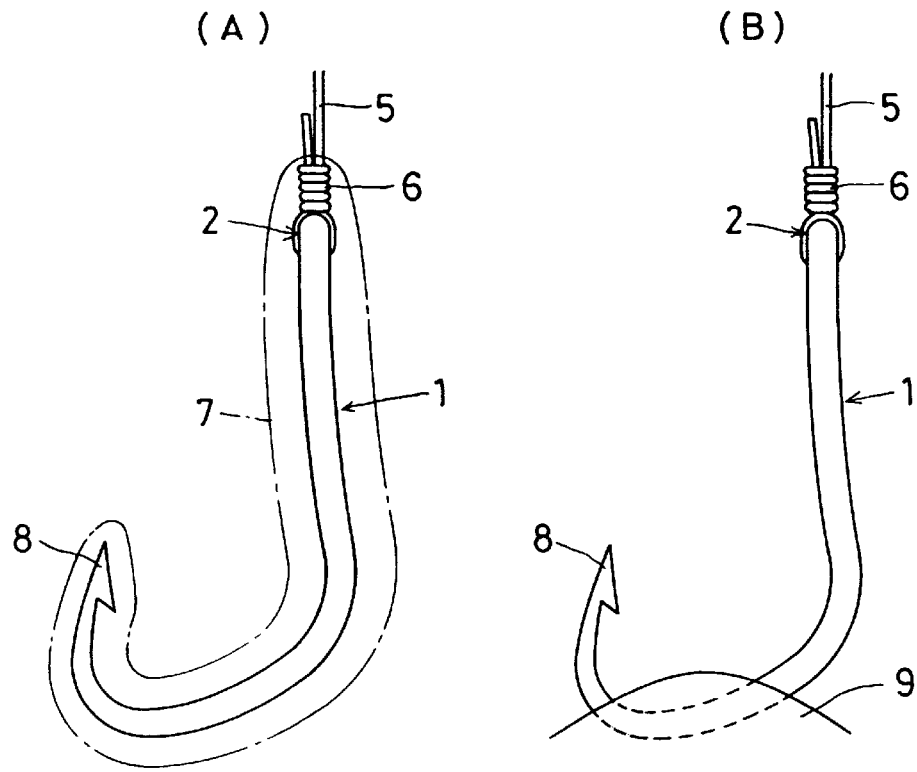
FIG. 4 shows a state of use of the fishhook of the invention, where
Figure 5:
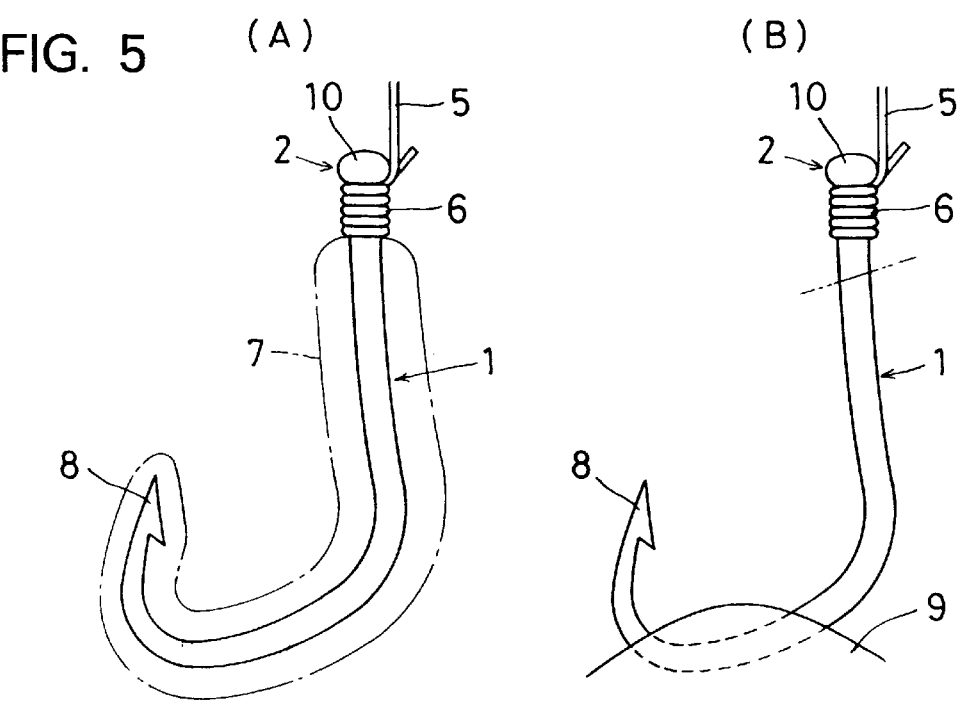
FIG. 5 shows a state of use of a conventional fishhook, where

FIG. 4(A) shows an example of the fishhook 1 of the present invention in use. The fishing line 5 does not protrude much from the surface 1*a* of the fishhook 1, and is formed above the root portion 2 of the fishhook 1 so as not to cover the trunk portion of the fishhook 1.

Therefore, the root portion 2 of the fishhook 1 has no protruding portion that would make an obstacle in passing the bait 7, so that the whole fishhook 1 can be covered with the bait. This improves attraction of fish to the bait 7.

Further, in the event that the hook tip 8 of the fishhook 1 has accidentally stuck into the skin 9, a protruding portion, which would make an obstacle in passage through the skin 9, is absent at the root portion 2 of the fishhook 1. Thus, the whole fishhook 1 can be removed by passing the whole fishhook 1 through the skin 9 without cutting off the fishhook 1 with pliers.

In such a case, since the fishing line 5 does not protrude much from the surface 1*a* of the fishhook, the fishhook 1 can be passed through the skin 9 and thereby removed, as it is, only by cutting the fishing line 5 at some midpoint without the need of undoing the knot 6 of the fishing line 5.

As shown above, according to the present invention, since there is no protruding portion at the root portion of the fishhook and fishing line does not protrude much from the surface of the fishhook, the whole fishhook can be covered with bait so that better attraction of fish to the bait can be offered.

Furthermore, if the hook tip of the fishhook accidentally sticks into the skin, the fishhook can be passed through the skin. The fishhook can be easily removed only by cutting the fishing line, and without requiring the fishhook to be cut with pliers.

What is claimed is:

1. A fishhook comprising:
   a shank with an end connected to a root portion
   said root portion having a tip end and a surface;
   a through hole defined through said root portion adapted to pass fishing line therethrough, wherein said through hole includes a first opening and a second opening provided opposite from said first opening;
   a groove provided in said surface of said root portion extending from said first opening, continuing across said tip end, and extending to said second opening;
   the depth of said groove being less that one half a diameter of said shank, and
   a fishhook tip connected to said shank at another end.

2. The fishhook of claim 1, wherein said through hole has a through hole diameter ranging from 0.6 mm to 1.0 mm.

3. The fishhook of claim 1, wherein said groove has a depth ranging from 0.3 mm to 0.5 mm.

4. The fishhook of claim 1, wherein said root portion has an outer diameter equal to a distance from said through hole to a bottom of said groove at said tip end of said root portion.

5. The fishhook of claim 1, further comprising a trunk portion provided between said tip end and said fishhook tip, wherein said trunk portion has a trunk thickness and said through hole has a through hole diameter is less than or equal to 30 percent of said trunk thickness.

6. The fishhook of claim 1, wherein said through hole has a through hole diameter and said groove has a width equal to said through hole diameter.

7. The fishhook of claim 1, wherein said fishhook tip includes a barb.

8. A fishhook line assembly, comprising:
   a shank with an end connected to a root portion
   said fishhook including a root portion having a tip end and a surface, a through hole defined through said root portion, wherein said through hole includes a first opening and a second opening provided opposite from said first opening, a groove provided in said surface of said root portion extending from said first opening, continuing across said tip end, and extending to said second opening, the depth of the groove being less than one half a diameter of said shank, and a fishhook tip connected to said shank at another end; and
   a fishing line passing through said through hole, wherein said fishing line has a fishing line radius and a fishing line diameter.

9. The fishhook of claim 8, wherein said through hole has a diameter greater than said fishing line diameter.

10. The fishhook of claim 8, where in said groove has a depth ranging from said fishing line radius to said fishing line diameter.

\* \* \* \* \*